United States Patent
Han

(10) Patent No.: US 9,660,717 B2
(45) Date of Patent: May 23, 2017

(54) BASE STATION SIGNAL MATCHING DEVICE AND RELAY DEVICE INCLUDING THE SAME

(71) Applicant: SOLID, INC., Gyeonggi-do (KR)

(72) Inventor: Kyung Eun Han, Gyeonggi-do (KR)

(73) Assignee: SOLID, INC., Seongnam-si (KR)

( * ) Notice: Subject to any disclaimer, the term of this patent is extended or adjusted under 35 U.S.C. 154(b) by 0 days.

(21) Appl. No.: 14/411,486

(22) PCT Filed: Aug. 14, 2014

(86) PCT No.: PCT/KR2014/007595
§ 371 (c)(1),
(2) Date: Dec. 26, 2014

(87) PCT Pub. No.: WO2015/093713
PCT Pub. Date: Jun. 25, 2015

(65) Prior Publication Data
US 2016/0285538 A1 Sep. 29, 2016

(30) Foreign Application Priority Data
Dec. 20, 2013 (KR) .................. 10-2013-0160753

(51) Int. Cl.
*H04M 1/00* (2006.01)
*H04B 7/155* (2006.01)
*H04W 52/46* (2009.01)

(52) U.S. Cl.
CPC ......... *H04B 7/15507* (2013.01); *H04B 7/155* (2013.01); *H04W 52/46* (2013.01)

(58) Field of Classification Search
CPC .... H04B 7/15542; H04B 7/1555; H04B 3/28; H04B 7/15; H04B 7/155; H04B 7/15528;
(Continued)

(56) References Cited

U.S. PATENT DOCUMENTS

2006/0019603 A1* 1/2006 Pergal ............... H04B 7/15542
455/15
2009/0156118 A1* 6/2009 Schadler ............. H01Q 21/205
455/25
(Continued)

FOREIGN PATENT DOCUMENTS

JP 2010-252274 A 11/2010
KR 10-1122956 B1 1/2006
(Continued)

OTHER PUBLICATIONS

Notice to Submit Response received in the Korean Patent Office in Korean Patent Application No. 10-2013-0160753, along with an English translation thereof.
(Continued)

*Primary Examiner* — Golam Sorowar
(74) *Attorney, Agent, or Firm* — Sughrue Mion, PLLC

(57) ABSTRACT

A base station signal matching device configured to receive a base station signal from a base transceiver station (BTS), the base station signal matching device is embedded in a relay device, and the base station signal matching device includes a signal attenuation unit configured to receive the base station signal and attenuate the input power level of the base station signal; and a signal matching unit configured to receive the base station signal passing through the signal attenuation unit to match the base station signal suitable for signal processing of the relay device.

7 Claims, 4 Drawing Sheets

(58) Field of Classification Search
CPC ............ H04B 7/15535; H04B 7/15564; H04B 7/15585; H04B 7/2606; H04W 16/26; H04W 24/04; H04W 52/38; H04W 52/52; H04W 84/00; H03F 1/02; H03F 2200/231; H03F 2200/451; H03F 3/00; H03F 3/19; H03F 3/195; H03F 3/72
See application file for complete search history.

(56) References Cited

U.S. PATENT DOCUMENTS

2011/0285477 A1* 11/2011 Nakagawa ............... H03H 7/09
 333/185
2012/0309293 A1* 12/2012 Kummetz ............ H04B 7/2606
 455/11.1

FOREIGN PATENT DOCUMENTS

| | | |
|---|---|---|
| KR | 10-2007-0040587 | 4/2007 |
| KR | 10-0761034 B1 | 9/2007 |
| KR | 10-0881405 A | 4/2008 |
| KR | 10-2013-0032778 A | 4/2013 |

OTHER PUBLICATIONS

International Search Report for PCT/KR2014/007595.

* cited by examiner

US 9,660,717 B2

BASE STATION SIGNAL MATCHING DEVICE AND RELAY DEVICE INCLUDING THE SAME

TECHNICAL FIELD

The inventive concept relates to a base station signal matching device, and more particularly, to a base station signal matching device embedded in a donor equipment of a relay system such as a distributed antenna system (DAS), to match a base station signal directly transmitted from a base transceiver system (BTS) suitable for signal processing of a relay device.

BACKGROUND ART

A distributed antenna system (DAS) receives signals transmitted from a base station to remove shadow areas that necessarily occur indoors or outdoors and to increase the capacity of data. Generally, the DAS performs a function of receiving a downlink signal transmitted from a base station and re-transmitting, to the base station, an uplink signal transmitted from a subscriber terminal in a corresponding service area.

Therefore, signal matching between a base station (i.e., a base transceiver system (BTS)) and the DAS is required. That is, a base station signal (a BTS signal) is matched in a duplexer type where Tx and Rx are coupled, and a DAS signal is generally configured in a simplexer type where Tx and Rx are separated. Therefore, a signal matching device for matching between the base station signal and the DAS signal is required. The signal matching device is configured as a separate device (i.e., an external BTS signal matching device) at an outside of the DAS (see FIG. 1).

In this state, the external BTS signal matching device uses an attenuator for attenuating the output of a signal from a base station to switch a signal of a high power level from the base station to an appropriated level of a signal from the DAS, and a filter for separating a base station signal of the duplexer type, transmitted from the BTS, into downlink and uplink signals.

In a conventional art, passive elements in the external BTS signal matching device should deal with high output power of the base station. Therefore, in the conventional art, a high power attenuator and a cavity filter are used as the passive elements as shown in FIG. 2. In this case, the passive elements are very high priced, and the size of the device is also increased. Here, the cavity filter has a form in which Tx and Rx signals are coupled, and performs a function of separating a signal input through one port into Tx and Rx signals of the input signal.

In the conventional art, a high power attenuator is used as the attenuator in order to deal with a high output of the base station, and therefore, the passive intermodulation (PIM) characteristic of the attenuator is not good. Accordingly, as a method for solving this problem in the conventional art, the components are arranged in the order of the cavity filter→the high power attenuator, thereby reducing the PIM characteristic. However, two high power attenuators are required rather than one high power attenuator according to the arrangement order described above. In FIG. 2, the external BTS signal matching device is separately provided with an attenuator for performing signal attenuation at a power level suitable for inputting a high power signal in a Tx signal direction (i.e., a downlink direction) to the DAS, and an attenuator for performing signal attenuation at a power level necessary for transmitting a DAS signal (i.e., a terminal signal processed by the DAS) in an Rx signal direction (i.e., an uplink direction) to the base station (BTS). In the conventional art, two high power attenuators are required as described above, and therefore, the cost of the device increases.

In addition, the external signal matching device is configured with passive elements, and hence input/output signal level (power level) and the like cannot be monitored.

An embodiment of the inventive concept is directed to a relay device in which a base station signal matching device for matching a base station signal transmitted from a base transceiver system (BTS) is embedded in a donor equipment in a relay system such as a distributed antenna system, so that it is unnecessary to dispose a separate BTS matching device at an outside of the relay device for the purpose of base station signal matching.

Another embodiment of the inventive concept is directed to a base station signal matching device which can improve passive intermodulation characteristics, reduce the entire manufacturing cost and volume of a product, and perform power monitoring of Tx/Rx signals.

SUMMARY

According to an aspect of the inventive concept, a base station signal matching device configured to receive a base station signal from a base transceiver system (BTS), the base station signal matching device being embedded in a relay device, the base station signal matching device includes a signal attenuation unit configured to receive the base station signal and attenuate the input power level of the base station signal; and a signal matching unit configured to receive the base station signal passing through the signal attenuation unit to match the base station signal suitable for signal processing of the relay device.

The signal attenuation unit may include a main attenuator configured to attenuate the power level of an input signal at a fixed rate, and a sub-attenuator disposed prior to the main attenuator based on a signal transmission path of the base station signal.

The sub-attenuator may be manufactured in a coil form using a signal attenuation medium with which the attenuation of a radio frequency (RF) signal is possible.

The signal matching unit may include a first filter configured to receive the base station signal passing through the signal attenuation unit, the first filter having a pass band including a service frequency band of the base station signal; and a second filter configured to have a pass band including a service frequency band of a terminal signal to be received to the relay device and transmitted to the BTS.

The signal matching unit may further include a first variable attenuator configured to perform signal attenuation so that the base station signal passing through the first filter has power of a level suitable for signal processing of the relay device; and a second variable attenuator configured to perform signal attenuation of the terminal signal so that the terminal signal received to the relay device has power of a level suitable for transmission to the BTS by considering a signal attenuation rate caused by the signal attenuation unit according to the signal transmission path of the terminal signal.

The signal matching unit may further include a first power detector configured to monitor whether the base station signal passing through the first variable attenuator has the power of the level suitable for signal processing of the relay device; and a second power detector configured to monitor the power level of the terminal signal passing through the second variable attenuator.

When the relay device is connected to a plurality of BTSs, a set of signal attenuator and a set of signal matching units may be provided for a plurality of ports corresponding to the plurality of BTSs, respectively.

The base station signal matching device may further include a signal coupling unit configured to couple base station signals respectively received from the plurality of BTSs to be output via the signal matching units provided for the ports; and a signal division unit configured to receive a terminal signal received to the relay device, the signal division unit inputting the terminal signal to any one of the signal matching units respectively provided for the ports, so that the terminal signal is transmitted to a BTS corresponding to a transmission destination of the terminal signal.

According to another aspect of the inventive concept, a relay device having the base station signal matching device embedded therein, as a donor equipment constituting a distributed antenna system.

According to the inventive concept, a base station signal matching device for matching a base station signal transmitted from a BTS is embedded in a donor equipment in a relay system such as a distributed antenna system, so that it is unnecessary to dispose a separate BTS matching device at an outside of the relay device for the purpose of base station signal matching.

According to the base station signal matching device of the inventive concept, it is possible to improve passive intermodulation characteristics, reduce the entire manufacturing cost and volume of a product, and perform power monitoring of Tx/Rx signals.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
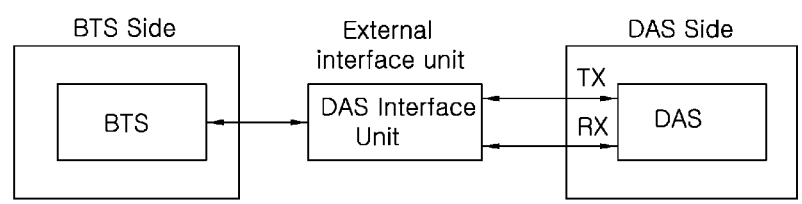
FIG. 1 is a diagram illustrating an external matching device for signal matching between a base transceiver system (BTS) and a distributed antenna system (DAS) according to a conventional art.
Figure 2:
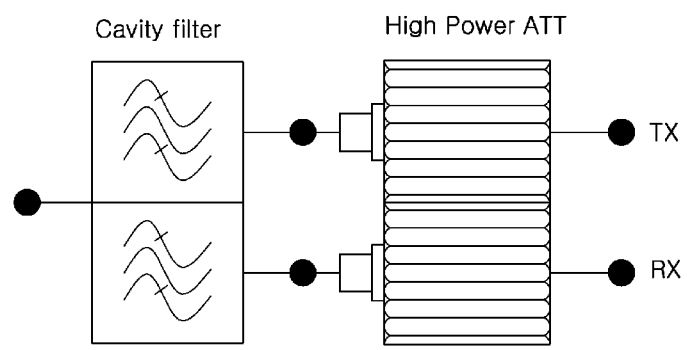
FIG. 2 is a diagram illustrating the internal configuration of the external matching device.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

Throughout the description of the inventive concept, when describing a certain technology is determined to evade the point of the inventive concept, the pertinent detailed description will be omitted. Numerals (e.g., first, second, etc.) used in the description of the inventive concept are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

A base station signal matching device 100 according to an embodiment of the inventive concept is provided in an embedded form in a corresponding relay device for the purpose of matching between a base transceiver system (hereinafter, referred to as a BTS) and the relay device. That is, unlike the conventional art in which the external signal matching device is provided at the outside of the relay device, the base station signal matching device according to the embodiment of the inventive concept is provided inside the relay device, to perform signal matching between the BTS and relay device. The base station signal matching device may be applied to various applications to which signal matching with the BTS is required. However, in this specification, a matching case between the BTS and a distributed antenna system will be mainly described. In this case, the relay device may be a donor equipment that initially receives a base station signal from the BTS in the DAS.

Figure 3:
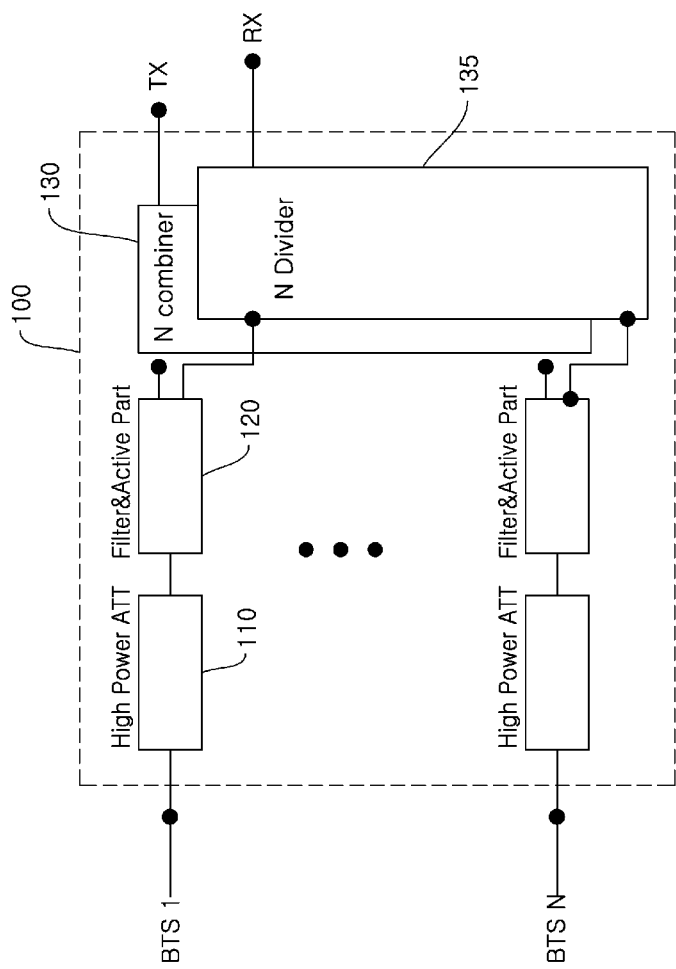
FIG. 3 is a block diagram illustrating a base station signal matching device embedded in a DAS (i.e., a donor relay equipment) for the purpose of signal matching with a BTS according to an embodiment of the inventive concept.
Figure 4:
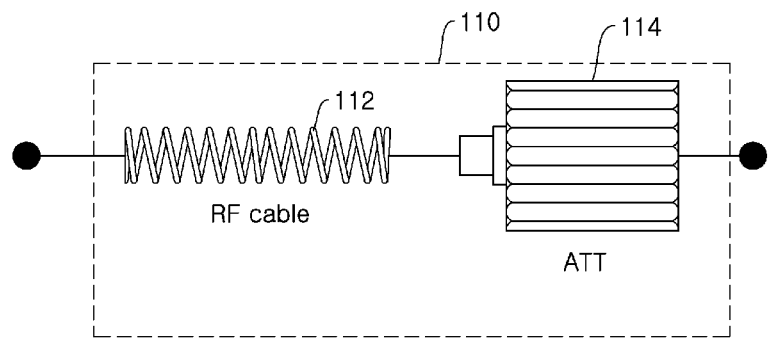
FIG. 4 is a diagram illustrating the configuration of a signal attenuator in the base station signal matching device according to the embodiment of the inventive concept.
Figure 5:
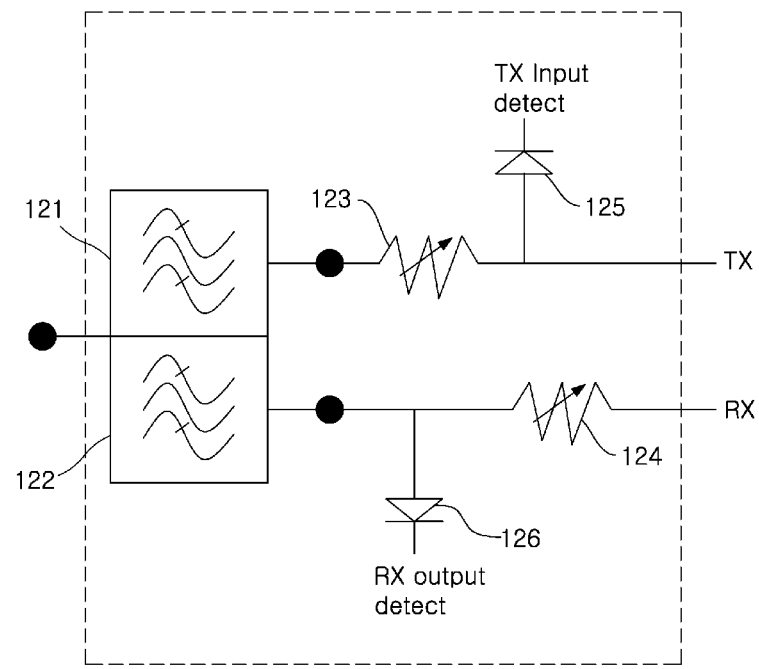
FIG. 5 is a diagram illustrating the configuration of a signal matching unit in the base station signal matching device according to the embodiment of the inventive concept.
Figure 6:
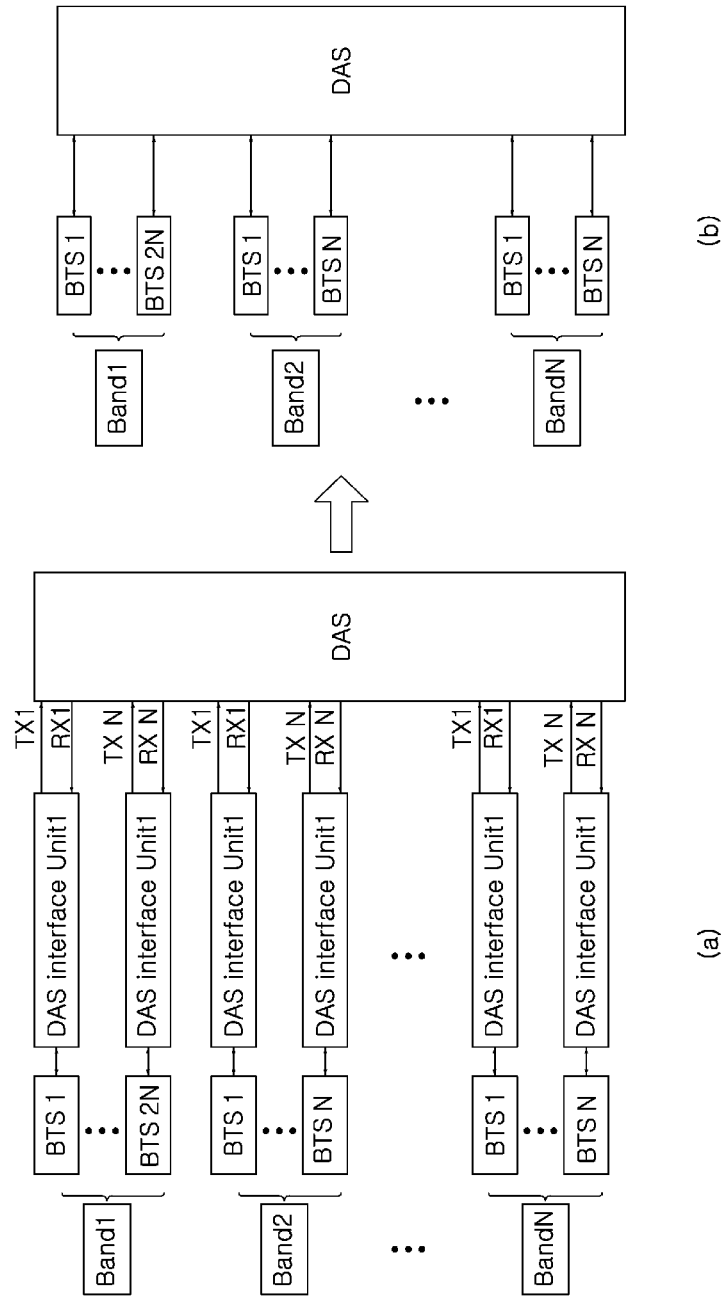
FIG. 6 is a diagram illustrating application forms of the conventional art and the inventive concept based on when one or more matching ports are provided for each service frequency band.

Hereinafter, the configuration of a base station signal matching device according to an embodiment of the inventive concept will be described in detail with reference to FIG. 3 in conjunction with FIGS. 4 to 6. Here, FIG. 3 is a block diagram illustrating a base station signal matching device embedded in a DAS (i.e., a donor relay equipment) for the purpose of signal matching with a BTS according to an embodiment of the inventive concept. FIG. 4 is a diagram illustrating the configuration of a signal attenuator in the base station signal matching device according to the embodiment of the inventive concept. FIG. 5 is a diagram illustrating the configuration of a signal matching unit in the base station signal matching device according to the embodiment of the inventive concept. FIG. 6 is a diagram illustrating application forms of the conventional art and the inventive concept based on when one or more matching ports are provided for each service frequency band.

Referring to FIG. 3, the base station signal matching device 100 includes a set of signal attenuators 110 and a set of signal matching units 120, provided for each of a plurality of matching ports respectively connected to a plurality of BTSs. That is, when a plurality of BTSs exist for each service frequency band (i.e., each band) (see FIG. 6), the signal attenuator 110 and the signal matching unit 120 may be provided for each of a plurality of ports respectively connected to the plurality of BTSs. In this case, the base station signal matching device 100, as shown in FIG. 3, may include a signal coupling unit 130 for coupling a base station signal (i.e., a signal in a downlink direction) passing through the signal attenuator 110 and the signal matching unit 120 for each matching port. The base station signal matching device 100 may include a signal division unit 135 for receiving a terminal signal (i.e., a signal in an uplink direction) received to a relay device having the base station signal matching device 100 embedded therein to be processed, and performing signal division so that the corresponding terminal signal can be transmitted to a BTS corresponding to a transmission destination.

Hereinafter, the configuration of the signal attenuator 110 and the signal matching unit 120 will be described in detail with reference to FIGS. 4 and 5.

The signal attenuator 110 attenuates the input power level of a base station signal input to the matching port. Referring to FIG. 4, the signal attenuator 110 may be configured to include a main attenuator 114 and a sub-attenuator 112. The sub-attenuator 112 is disposed prior to the main attenuator 114 based on a signal transmission path of a base station signal (downlink signal).

In this state, the sub-attenuator 112 may be manufactured in a coil form using a signal attenuation medium (RF cable in this embodiment) with which the attenuation of a radio frequency (RF) signal is possible. For example, the sub-attenuator 112 may be manufactured by winding, in a coil form, an RF cable having a length of a few meters or more. The sub-attenuator 112 is disposed prior to the main attenuator 114 in the signal attenuator 110, to perform a function of previously attenuating the power of a signal to be input to the main attenuator 114.

As such, the signal attenuator 110 is configured so that a signal with high power, transmitted from the BTS, first passes through the sub-attenuator 112 before passing through the main attenuator 114. Thus, in the embodiment of the inventive concept, even an attenuator having an attenuation rate lower than that of the high power ATT used in the conventional art can be used as the main attenuator 114. Accordingly, in the embodiment of the inventive concept, passive intermodulation (PIM) characteristics caused by the signal attenuator 110 are relatively improved as compared with those when the conventional high power ATT is used. As will be described later, in the embodiment of the inventive concept, a first variable attenuator 123 and a second variable attenuator 124 are additionally provided in the signal matching unit 120, in addition to the main attenuator 114, and thus the attenuation rate of the main attenuator 114 can be further lowered. The detailed processing with respect to signal attenuation in Tx and Rx directions is possible based on a variable attenuation function performed by the first and second variable attenuators 123 and 124.

The signal matching unit 120, in the downlink direction, performs a function of receiving a base station signal passing through the signal attenuator 110 to match the corresponding base station signal suitable for signal processing of the relay device. The signal matching unit 120, in the uplink direction, performs a function of receiving a terminal signal processed by the relay device to match the corresponding terminal signal suitable for signal processing of the BTS.

Referring to FIG. 5, the signal matching unit 120, in the downlink direction, may include a first filter 121, the first variable attenuator 123 and a first power detector 125. The signal matching unit 120, in the uplink direction, may include a second filter 122, the second variable attenuator 124 and a second power detector 126.

Here, the first filter 121 receives a base station signal that previously passed through the signal attenuation unit 110. In this state, the first filter 121 has a pass band characteristic in which the filter 121 passes through a service frequency band of the corresponding base station signal. The second filter 122 has a pass band characteristic in which the second filter 122 passes through a service frequency band of a terminal signal received to the relay device to be transmitted to the BTS.

Thus, the signal separation in the Tx and Rx directions can be performed by the first and second filters 121 and 122. In the conventional art, the signal matching order has an order of the filter→the attenuator, the high-priced cavity filter was used. However, in the embodiment of the inventive concept, the components are arranged in the order of the attenuator→the filter, and thus a low-priced filter (e.g., a low-priced, light and small ceramic filter) can be used.

The base station signal passing through the first filter 121 is finally attenuated to have power of a level suitable for signal processing of the relay unit through the first variable attenuator 123. In this state, the power level of the base station signal after passing through the first variable attenuator 123 may be monitored using the first power detector 125. That is, in the embodiment of the inventive concept, it is possible to check (identify) whether the base station signal separated in the Tx direction has a power level suitable for signal processing of the relay unit.

The second variable attenuator 124 performs signal attenuation so that the terminal signal received to the relay device to be processed has a level suitable for transmission to the BTS. In this state, the terminal signal will further pass through the signal attenuator 110 described above on the signal transmission path (i.e., the transmission path of an uplink signal), and therefore, the signal attenuation rate caused by the second variable attenuator 124 may be determined by simultaneously considering a subsequent signal attenuation rate caused by the signal attenuator 110. The power level of the terminal signal after passing through the second variable attenuator 124 may be monitored using the second power detector 126. That is, in the embodiment of the inventive concept, the power level of a terminal signal in the Rx direction may also be checked.

As described above, according to the embodiment of the inventive concept, it is possible to provide a base station signal matching device in which the function of the conventional independent external matching device is embedded in the DAS, and PIM characteristics and the like can be improved while using passive elements capable of reducing the size of a low-priced device without using a high-priced, heavy and large-sized cavity filter and a high power attenuator having a poor PIM characteristic. Further, according to the embodiment of the inventive concept, a function capable of monitoring input/output power levels applied to the device is added, and thus it is possible to perform more precise control. Referring to (b) of FIG. 6, the set of signal attenuators 110 and the set of signal matching unit 120 are configured for each band and for each matching port connected to each BTS, as compared with the conventional art as shown in (a) of FIG. 6. Thus, the implementation of the entire system is very simple, and the extensibility of the device is excellent.

While the inventive concept has been described with respect to the specific embodiments, it will be apparent to those skilled in the art that various changes and modifications may be made without departing from the spirit and scope of the invention as defined in the following claims.

What is claimed is:

1. A base station signal matching device included in a distributed antenna system, the base station signal matching device comprising at least one processor to implement:
   a signal attenuation unit configured to receive a base station signal from a base transceiver system (BTS) and attenuate a power level of the base station signal; and
   a signal matching unit configured to receive the attenuated base station signal output from the signal attenuation unit and process the attenuated base station signal to be suitable for signal processing of the distributed antenna system by variably attenuating a power level of the attenuated base station signal,
   wherein the signal attenuation unit includes:
      a first attenuator configured to attenuate the power level of the base station signal according to a first fixed attenuation ratio; and
      a second attenuator disposed after the first attenuator in a signal transmission path and configured to attenuate the power level of the base station signal output from the first attenuator according to a second fixed attenuation ratio.

2. The base station signal matching device of claim 1, wherein the first-attenuator is manufactured in a coil form using a signal attenuation medium with which an attenuation of a radio frequency (RF) signal is possible.

3. The base station signal matching device of claim 1, wherein the signal matching unit includes:
   a first filter configured to receive the attenuated base station signal output from the signal attenuation unit and pass a first frequency band of the attenuated base station signal; and
   a second filter configured to pass a second frequency band of a terminal signal that is sent from a terminal to the BTS via the distributed antenna system.

4. The base station signal matching device of claim 3, wherein the signal matching unit further includes:
   a first variable attenuator configured to attenuate a signal output from the first filter to have a power level suitable for signal processing of the distributed antenna system; and
   a second variable attenuator configured to attenuate the terminal signal so that the second frequency band of the terminal signal has a power level suitable for transmission to the BTS.

5. The base station signal matching device of claim 4, wherein the signal matching unit further includes:
   a first power detector configured to monitor a power level of the first frequency band of the base station signal output from the first variable attenuator; and
   a second power detector configured to monitor a power level of the second frequency band of the terminal signal output from the second variable attenuator.

6. The base station signal matching device of claim 1, wherein the distributed antenna system is connected to a plurality of BTSs and a combination of the signal attenuation unit and the signal matching unit is provided for each of a plurality of ports, the plurality of ports respectively corresponding to the plurality of BTSs.

7. The base station signal matching device of claim 6, further comprising:
   a signal coupling unit configured to couple base station signals respectively received from the plurality of BTSs to be output via the signal matching units provided for the ports; and
   a signal division unit configured to receive a terminal signal received to the distributed antenna system, the signal division unit inputting the terminal signal to any one of the signal matching units respectively provided for the ports, so that the terminal signal is transmitted to a BTS corresponding to a transmission destination of the terminal signal.

* * * * *